United States Patent [19]

Pettersen et al.

[11] Patent Number: 5,440,392
[45] Date of Patent: Aug. 8, 1995

[54] METHOD AND SYSTEM FOR POINT BY POINT MEASUREMENT OF SPATIAL COORDINATES

[75] Inventors: Alf Pettersen, Gjettum; Øyvind Rotvold, Hvalstad, both of Norway

[73] Assignee: Metronor AS, Nesbru, Norway

[21] Appl. No.: 211,734

[22] PCT Filed: Oct. 9, 1992

[86] PCT No.: PCT/NO92/00167
§ 371 Date: Apr. 11, 1994
§ 102(e) Date: Apr. 11, 1994

[87] PCT Pub. No.: WO93/07443
PCT Pub. Date: Apr. 15, 1993

[30] Foreign Application Priority Data

Oct. 11, 1991 [NO] Norway ................................ 913994

[51] Int. Cl.$^6$ ............................................. G01B 11/03
[52] U.S. Cl. ..................................... 356/375; 356/376
[58] Field of Search .................. 356/375, 376; 33/502, 33/503, 504, 554, 555, 556

[56] References Cited
FOREIGN PATENT DOCUMENTS 456454 10/1988 Sweden .
WO89/09922 10/1989 WIPO .
WO91/16598 10/1991 .

Primary Examiner—F. L. Evans
Attorney, Agent, or Firm—Cushman Darby & Cushman

[57] ABSTRACT

A system for point by point measurement of spatial coordinates, in which a touch probe including three point-sized light sources at known local coordinates relative to a local probe fixed coordinate system and with a touch point at known location relative to the local coordinate system, is used such that the touch probe touches the point to be measured. A single optoelectronic angle sensor for measurement of spatial direction towards point sized light sources is set up such that its field of view/work area covers the essential parts of the object to be measured, and such that the light sources of the touch probe are seen from the angle sensor for all the relevant measurement points. The spatial directions for all of the light sources of the touch probe are registered simultaneously. Based on the registered spatial directions, the position and orientation of the touch probe are calculated relative to said single angle sensor, and such that the position of the touch probe is related to its point of contact with the measured object.

7 Claims, 2 Drawing Sheets

METHOD AND SYSTEM FOR POINT BY POINT MEASUREMENT OF SPATIAL COORDINATES

BACKGROUND OF THE INVENTION

The present invention relates to an opto-electronic system for point by point measurement of spatial coordinates. More specifically, the invention relates to a method and system for point by point measurement of spatial coordinates, where a touch probe comprising a minimum of three point-sized light sources at known coordinates relative to a local probe fixed coordinate system and with a touch point at a known location relative to the local coordinate system, is brought into contact with the point for which the coordinates are to be determined.

The system is based on the use of opto-electronic angle sensors calibrated for measurement of angles in two dimensions (spatial direction) towards active light sources or diffuse light reflexes, e.g. as described by the inventors in Norwegian Patent No. 165046.

The present invention proposes a system solution using one angle sensor in combination with a measurement probe as described by the inventors in Norwegian Patent Application No. 901891, and in Swedish Patent no. 456 454.

A system according to the invention described in Norwegian Patent no. 165046 allows registration with high precision of the position, orientation and/or surface geometry of objects, either static or dynamic. This is only to a limited extent possible by existing non-contact measurement techniques. The flexibility and transportability of the system makes it applicable for measurement tasks that can not be solved by conventional mechanical coordinate measurement machines. Such machines are large and complex, expensive and less flexible. The system is optimized for high accuracy.

As one angle sensor alone gives the information of the direction towards a point only, conventionally two or more angle sensors are used in combination. The spatial coordinates of a point are calculated by a so called intersection technique. Starting from known coordinates of the angle sensors, as well as the measured spatial directions, the coordinates are calculated for the point where the lines of sight from the individual angle sensors intersect. In the case of using two angle sensors the intersection angle shall be as close to 90 degrees as possible to obtain optimum accuracy in all three dimensions (x, y, z). This introduces high requirements for free sight, since all measurement points have to be seen from at least two different directions. This may be a problem in industrial applications, since the object to be measured is often partly or completely hidden by robots or other production equipment.

The present further development suggests a simplified system based on one angle sensor and a specially made touch probe. Spatial coordinates can be determined by the use of only one angle sensor, if the touch probe is equipped with a minimum of three measurement points at known locations relative to the touch point of the probe. The use of a touch probe eliminates sighting problems, both by the fact that the measurement point itself must not be seen by the angle sensor as long as all of the measurement points of the probe are seen, and that the line of sight requirements are reduced to that of one angle sensor only. This leads to a simplified setup of the angle sensor, better access to difficult areas, better transportability, and increased measurement speed.

Normally, a system based on one angle sensor only, will not give the same accuracy in spatial coordinates as systems based on a plurality of angle sensors of corresponding type. Especially this is the case for the direction of depth relative to the angle sensor. However, there are a number of geometry measurement tasks where the flexibility and measurement speed requirements are higher than the accuracy requirements. Furthermore, there are a number of industrial measurement problems where a high accuracy is required in two dimensions, but less in depth, e.g. the determination of the straightness and roundness of an aircraft fuselage.

Norwegian Patent No. 165046 describes a fully automatic and accurately calibrated angle sensor as shown in FIG. 1. That sensor is developed to measure the direction towards points like active light sources or points illuminated by active light sources. This ensures secure measurement point identification, and hence allows automatic operation, as well as ensures a very high signal to noise ratio and hence contributes to high accuracy.

The angle sensor mainly comprises a camera housing 1, a lens unit 2 and a two dimensional array (matrix) 3 of photosensitive elements 5. The lens unit is a camera lens with standard, spherical optics, having a focal distance mainly given by the field of view requirements. Possibly, the lens may have an anti-reflection coating or optical filter, which has to be matched to the spectral distribution of the light sources to be used. The photosensitive elements may e.g., be of CCD (Charge Coupled Device) or CID (Charge Injected Device) type. Due to the accuracy requirements, normally matrices of maximum resolution will be applied. If the system speed is of main importance, matrices having fewer elements will be applied. High accuracy is ensured by the use of accurate procedures to calibrate the angle sensor. This is described in Norwegian Patent No. 165046.

FIG. 2 shows the principle for spatial direction measurements. The fully automatic function of the angles sensor is based on the use of active light sources, e.g., light-emitting diodes 6. The image of the light-emitting point 5 given by the lens system 2 is an illuminated spot 7 on the array of photosensitive elements 3. The image illuminates a number of elements 5 with an intensity distribution given by the size of the emitting point, and the resolution of the lens system. The position of the illuminated spot is an unambiguous measure of the spatial direction towards the imaged point. The spatial direction is given as two angles $\alpha$ and $\beta$. $\beta$ is the angle between the spatial direction and the horizontal plane of symmetry of the angle sensor, $\alpha$ is the angle between the optical-axis and the direction towards the projection of the light-emitting point into the horizontal plane of symmetry. Both angles $\alpha$ and $\beta$ have values 0 at the optical axis.

SUMMARY OF THE INVENTION

In the present invention, it is suggested to use one angle sensor in combination with a touch probe equipped with a minimum of three light sources in known coordinates relative to a local, probe fixed coordinate system. In addition, the touch probe has a touch point (reference point) which as an example can have a shape of a needle tip. By knowing the location of this point relative to the local coordinate system, the position of the touch probe can be related to this point.

Essentially, the touch probe will function as described in Swedish Patent No. 455 454, and may have exchangeable tools as described in Norwegian Patent Application No. 901821. FIG. 3 illustrates a probe for determination of the coordinates of a point. The probe comprises a body 8, three light sources 9–11, and a touch point 12 shaped as a needle tip.

According to the present invention, the method is characterized in that a single opto-electronic angle sensor designed to measure the spatial direction to point sized light sources, is located such that its field of view/working area basically covers the object to be measured, and such that the light sources of the touch probe will be visible to the angle sensor for all measurement points in question, that spatial direction for each of the light sources of the touch probe are registered simultaneously, and that the position and orientation of the touch probe relative to the single angle sensor are computed from the registered spatial directions, and such that the position of the touch probe is related to its touch point with the measured object.

Further the system of the invention is characterized in a single opto-electronic angle sensor designed to measure the spatial direction to point sized light sources, and means for computation of the position and orientation of the touch probe relative to the single angle sensor based on the knowledge of the position of the light sources relative to the touch point of the probe and the measured directions from the angle sensor to the individual light sources, and such that the position of the probe is related to the touch point.

According to further features of the system, according to the invention, the system touch probe is connected to the data processor of the system such that illumination time and intensity for each individual probe light source can be controlled from the signal level that is at any time registered by the angle sensor.

Also, the light sources exhibit a well defined and known spectral distribution, and that the angle sensor has an optical filter that matches this distribution.

Further features of the method are suggested, wherein the coordinates of a set of object points are measured repeatedly, using different locations of the angle sensor relative to the object, and all measured coordinates are combined by a least squares analysis or bundle adjustment calculation to improve the overall coordinate accuracy.

BRIEF DESCRIPTION OF THE INVENTION

Further features of the invention are given in the following description of examples being non-limitative to the invention, with references to the accompanying drawings, in which.

DETAILED DESCRIPTION

Figure 1:
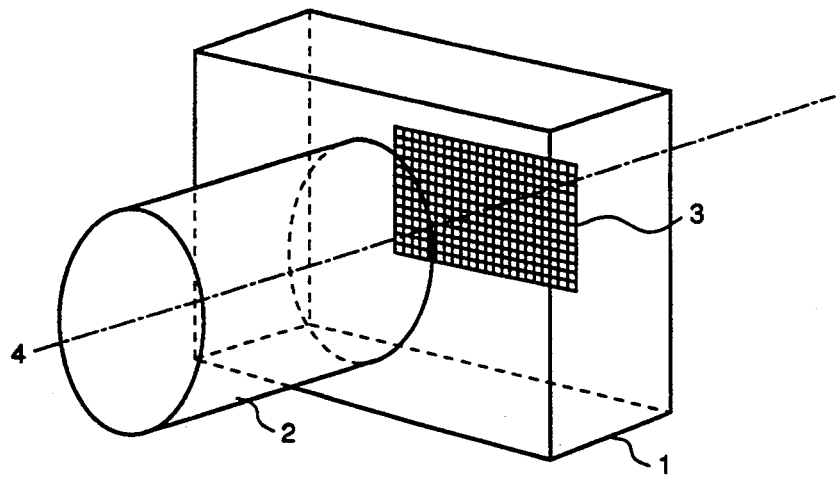
FIG. 1 is a diagrammatic perspective view of a prior art angle sensor.
Figure 2:
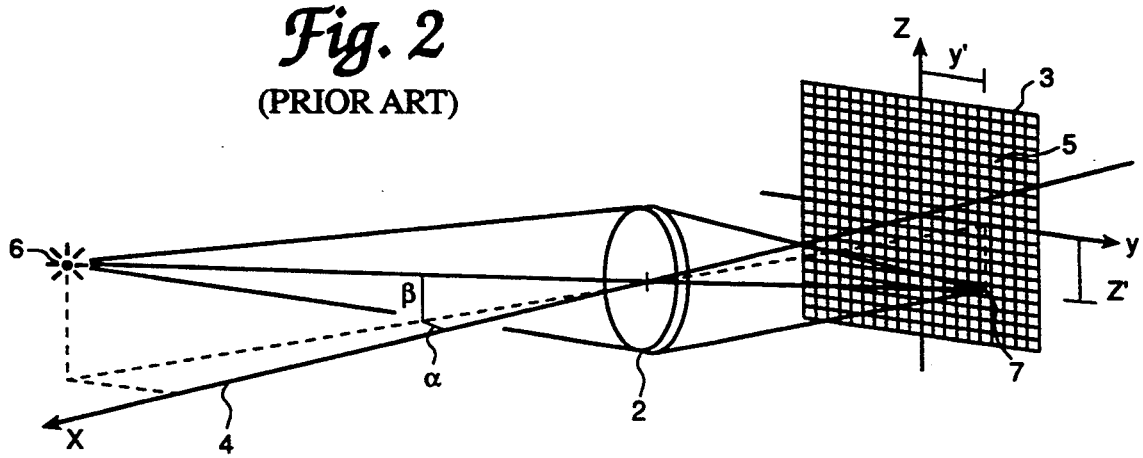
FIG. 2 is a diagrammatic illustration of the principle of making spatial direction measurements using active light sources, in accordance with teachings of the prior art.
Figure 3:
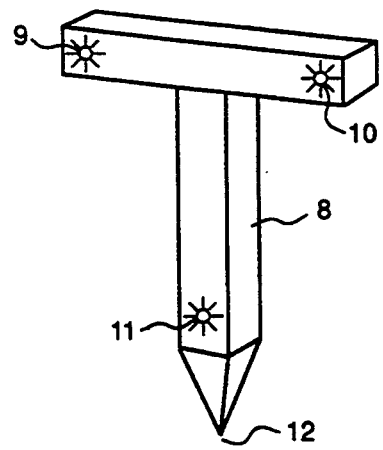
FIG. 3 is a diagrammatic perspective view of a prior art probe for use in determining coordinates of a point.
Figure 4:
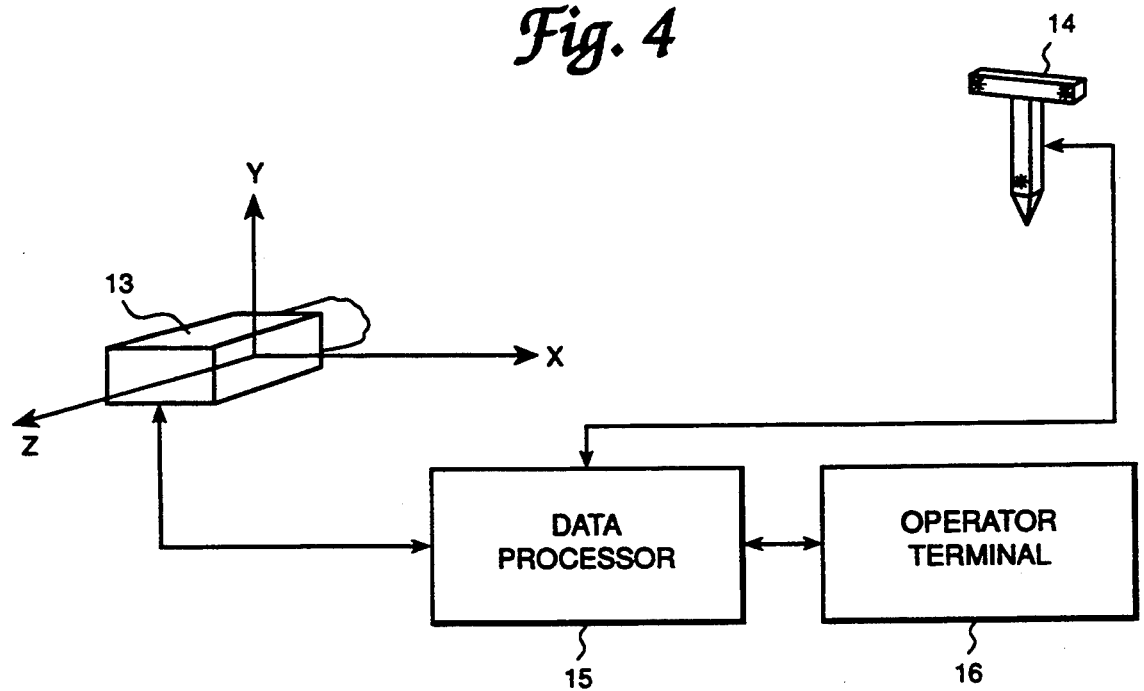
FIG. 4 illustrates a system according to the present invention based on one angle sensor and a touch probe.

FIG. 4 illustrates a complete system for point by point coordinate measurement. The system comprises an angle sensor 13, e.g. of the same type as described in Norwegian Patent No. 165045, a touch probe 14, a data processor 15, and an operator terminal 16. A coordinate measurement is made by bringing the touch probe into contact with the object to be measured, such that its touch point 12 touches the object in the point of interest. The spatial direction towards each of the individual light points of the probe are registered by the angle sensor 13. All light emitting points are registered simultaneously, such that for each registration there will be a number of intensity maximas registered by the sensor's array of photosensitive elements, corresponding to the number of light sources in the touch probe.

The system's data processor 15 is responsible for the acquisition of measurement data from the angle sensor, and the analysis of the data. The data analysis mainly includes:

measurement timing and exposure time control to optimize the signal to noise ratio, identification of the individual light sources, i.e. determination of which spot in the image that corresponds to which light source, calculation of the spatial direction for each individual light source, based on the image information, calculation of spatial coordinates for the touch probe.

The calculation of the spatial coordinates of the touch probe is based on the known location of the individual light sources relative to a probe fixed, local coordinate system. The calculation principle may be based on conventional resection technique, or photogrammetric calculation methods. By the use of photogrammetry technique, the projection of the light points into the array of photosensitive elements of the angle sensor is evaluated. The projection can be described by a rotation and translation matrix giving the position and orientation of the touch probe relative to the angle sensor. The computation is based on minimizing errors (least squares analysis) by utilizing redundant information. The necessary mathematical basics can be found in H. M. Kamara (Ed.): Non-topographic photogrammetry. Second Edition, 1987, page 37–55.

To do the computation it is essential to identify the individual light sources, i.e. which of the registered light spots in the image corresponds to which of the light sources. This is necessary for two reasons: to relate the measured directions for each light point to the correct local coordinates for that point relative to the probe fixed coordinate system, and if it is needed to adjust the light intensity or exposure time of one of the light sources, to known which one. The touch probe will be held manually by an operator. Hence it is important that all light sources are imaged simultaneously to avoid errors due to probe motions. This means that the identification can not be made by turning the light sources on in a sequence. The identification procedure depends on the shape of the touch probe. Furthermore, it should be possible to identify the light points even if one or more points are missing in the image, e.g. if parts of the probe is occluded by objects within the field of view.

To achieve optimum accuracy, it is important to have as high signal to noise ratio as possible. A method to achieve this is to connect the individual light sources of the touch probe to the data processor such that the exposure time and/or current levels can be adjusted to optimum conditions based on the measured intensity values for each light source. This method makes the system very flexible with respect to the allowed distance between the angle sensor and the touch probe.

The general ambient light or other light sources in the measurement field may give the measurements a significant noise contribution. To reduce this contribution, light sources of a well defined spectral distribution can be used, and additionally the angle sensor can be equipped with an optical filter that removes all light outside this spectral range.

Using the procedure as described, the calculated coordinates will be given relative to a coordinate system defined by the position and orientation of the angle sensor. The measurements can be related to any coordinate system, as long as there is a minimum of three points having well defined coordinates in that coordinate system. Measuring the global coordinates of these points, gives the necessary data to transform all measured coordinate values to the local coordinate system.

Improved three-dimensional coordinate measurement accuracy can be obtained by combining measurements of the same points made from different angle sensor locations around the object. The measurement data can be analyzed using a least squares analysis or bundle adjustment, based on the same mathematical concepts as used for theodolite measurement data analysis. By this method, the poor accuracy in the depth direction relative to the angle sensor is substituted by high accuracy measurements from other sensor locations.

If the system described in the present patent application is used in combination with a system based on two angle sensors as described in Norwegian Patent No. 155045, it will be an advantage first to position a number of auxiliary reference points and to measure their accurate position relative to a relevant coordinate system by the use of multiple angle sensor locations. Then, by using one or two angle sensors to measure only a small part of the overall object, these auxiliary reference points can be used to relate all measurements to the correct coordinate system.

An operator terminal 16 consisting of monitor and keyboard is connected to the data processor for the operator to communicate with the system. This unit can as an example be used for continuous and final presentation of measurement results.

Figure 5:
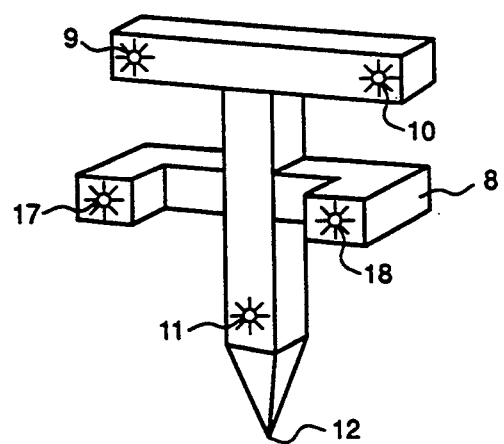
FIG. 5 illustrates a touch probe according to the present invention having 5 light sources.

The use of only one angle sensor to determine spatial coordinates strongly restricts the shape of the touch probe. The accuracy of the calculated coordinates depends on the shape and size of the measurement probe relative to the distance to the angle sensor and the field of view of the sensor. The minimum number of light sources is three, but this may give ambiguous results and poor accuracy. In FIG. 5, a touch probe having 5 light sources is proposed, three of these (9, 10, 11) defines a plane, the last two (17, 18) are separated from (i.e., located equal distance forwardly of) this plane. Such a shape gives significantly improved accuracy, as well as relatively simple and secure identification of each light source.

Angle sensors as described in Norwegian Patent No. 155046 are assumed above. These can be replaced by other types of angle sensors, e.g. automatic theodolites. Normally, theodolites can not register multiple light sources simultaneously, making the data acquisition time-consuming.

In the present context, the term angle sensors includes electro-optical sensors based on photogrammetric technique. In photogrammetry, a point is considered to be imaged through the projection center of a lens system, and the direction is given as the image coordinates of the image of the point in the image plane. The inner orientation of the camera, i.e. the parameters describing the relation between spatial direction and the image point, have to be known.

The measurement system as described above solves a number of measurement problems where at present no practically applicable methods exist:

alignment and adjustment of industrial production cells, where theodolites can not be used due to insufficient sight;

crash tests in the automotive industry: how is the car interior deformed? Theodolite systems and conventional photogrammetry can only be used for determination of the exterior deformation of the car body;

surveying of the interior geometry of aircraft and helicopter fuselages;

determination of the dynamic behavior of an object, by attaching the touch probe to the object to have a fixed relation between the internal probe fixed coordinate system of the probe and a local, object fixed coordinate system.

Due to the automatic operation, the flexibility and the simple setup of the measurement system, it is quite competitive relative to conventional use of theodolites for a number of applications:

surveying of the exterior geometry of aircrafts, helicopters, cars etc. where the accuracy requirements are not as high in all spatial dimensions, e.g. straightness and roundness of an aircraft fuselage;

measurement of deformation (downward flexing) of e.g., an aircraft wing;

high precision, large volume measurements using multiple angle sensor locations; this can be applied to check the coordinates of a number of well defined control points, or to establish a set of accurate reference points to be used when measurements are made within smaller parts of a large object.

We claim:

1. A method for point-by-point measurement of spatial coordinates of each of a plurality of points on an object, comprising:
    (a) positioning a single opto-electronic angle sensor designed to measure spatial direction to each of a plurality of point-sized light sources, such that its field of view or working area generally covers said object;
    (b) successively touching to each of said points a touch point of a touch probe having at least three point-sized light sources respectively disposed at known coordinates relative to a local probe coordinate system and a touch point disposed at a known location relative to said local probe coordinate system, while maintaining visibility of said touch probe to said angle sensor at each such touching;
    (c) simultaneously sensing, using said angle sensor, at each said touching, a spatial direction for each of said light sources and registering said spatial directions; and
    (d) computing the position and orientation of said touch probe relative to said angle sensor at each said touching, from the spatial directions registered in step (c).

2. The method of claim 1, further comprising:

(e) repeating step (b) and (c) a plurality of instances in regard to each of a plurality of said points on said object, with said angle sensor repositioned, in accordance with step (a), for each such instance; and in conducting step (d) combining the respective spatial directions by a least squares analysis or bundle adjustment calculation, for improving accuracy of said position and orientation as calculated in step (d).

3. The method of claim 1, wherein:

the touch probe used in step (b) has at least three point-sized light sources, three of which are disposed in a first plane, and two others of which are disposed in a second plane which is spaced from said first plane.

4. The method of claim 1, wherein:

said computing of step (d) is conducted by a computer;

said touch probe is arranged to be controlled by said computer; and steps (b) and (c), further include operating said computer to vary illumination time and intensity of said light sources.

5. A system for point-by-point measurement of spatial coordinates of each of a plurality of points on an object, comprising:

(a) a single opto-electronic angle sensor to measure spatial direction to each of a plurality of point-size light sources, and to be positioned such that its field of view or working area generally covers said object;

(b) a touch probe having at least three point-sized light sources respectively disposed at known coordinates relative to a local probe coordinate system and a touch point disposed at a known location relative to said local probe coordinate system, for successively touching each of said points while maintaining visibility of said touch probe to said angle sensor at each such touching;

said angle sensor being operable for simultaneously sensing at each said touching, a spatial direction for each of said light sources;

(c) a register for registering said spatial directions as sensed by said angle sensor; and (d) a computer for computing the position and orientation of said touch probe relative to said angle sensor at each said touching, from the spatial directions registered in said register.

6. The system of claim 5, further comprising:

control means effectively connecting said computer with said touch probe for varying illumination time and intensity of said light sources while using said angle sensor to measure said spatial directions.

7. The system of claim 5, wherein:

said light sources have a predetermined spectral distribution; and said angle sensor has an optical filter which matches said predetermined spectral distribution.

* * * * *